US012465542B1

(12) United States Patent
Alvarenga

(10) Patent No.: US 12,465,542 B1
(45) Date of Patent: Nov. 11, 2025

(54) COMBINED ABDOMINAL EXERCISER AND TREADMILL

(71) Applicant: Jose Alvarenga, Munford, TN (US)

(72) Inventor: Jose Alvarenga, Munford, TN (US)

( * ) Notice: Subject to any disclaimer, the term of this patent is extended or adjusted under 35 U.S.C. 154(b) by 522 days.

(21) Appl. No.: 18/120,031

(22) Filed: Mar. 10, 2023

(51) Int. Cl.
*A63B 22/02* (2006.01)
*A61H 1/00* (2006.01)
*A63B 23/02* (2006.01)

(52) U.S. Cl.
CPC ............. *A61H 1/005* (2013.01); *A63B 22/02* (2013.01); *A63B 23/0222* (2013.01); *A61H 2201/0192* (2013.01); *A61H 2201/1604* (2013.01); *A61H 2201/1623* (2013.01); *A61H 2201/1635* (2013.01); *A61H 2201/164* (2013.01); *A61H 2201/501* (2013.01); *A61H 2201/5035* (2013.01); *A61H 2201/5046* (2013.01); *A61H 2201/5048* (2013.01); *A61H 2201/5097* (2013.01); *A61H 2205/083* (2013.01); *A61H 2230/06* (2013.01); *A63B 2225/105* (2013.01)

(58) Field of Classification Search
CPC ............ A61H 1/005; A61H 2201/0192; A61H 2201/1604; A61H 2201/1623; A61H 2201/1635; A61H 2201/164; A61H 2201/501; A61H 2201/5035; A61H 2201/5046; A61H 2201/5048; A61H 2201/5097; A61H 2205/083; A61H 2230/06; A63B 22/02; A63B 23/0222; A63B 2225/105
See application file for complete search history.

(56) References Cited

U.S. PATENT DOCUMENTS 2,017,128 A 10/1935 O'neil, Jr.
3,826,491 A * 7/1974 Elder ................. A63B 22/0023 482/7
4,743,009 A * 5/1988 Beale ..................... A63B 22/02 482/901
9,511,252 B1 12/2016 Ho et al.
11,253,743 B1 * 2/2022 Mosqueda ......... A63B 21/4039
2007/0270286 A1 * 11/2007 Nielsen .................. A63B 24/00 482/54
2015/0352396 A1 * 12/2015 Dalebout ............... A63B 22/02 482/54

(Continued)

*Primary Examiner* — Sundhara M Ganesan
(74) *Attorney, Agent, or Firm* — Sanchelima & Associates, P.A.; Jesus Sanchelima; Christian Sanchelima

(57) ABSTRACT

A combined abdominal exerciser and treadmill including a console assembly, a treadmill assembly, and an oscillating motion assembly. The console assembly includes a display screen where the user may select a predetermined routine for walking, jogging, running, climbing, abs workout wherein said routines are also selectable by means of a remote controller. The console assembly may be oriented towards the treadmill and may rotate towards the oscillating motion assembly, thereby the user may interact with the console assembly either from the treadmill or the oscillating motion assembly. The oscillating motion assembly may provide a predetermined abs workout routine, where the abs workout routine consists of oscillation movements driven by upper and lower oscillating motion mechanisms. After a predetermined workout routine, the display screen may display health information levels of the user.

18 Claims, 12 Drawing Sheets

(56) References Cited

U.S. PATENT DOCUMENTS

| | | | | |
|---|---|---|---|---|
| 2015/0367171 | A1* | 12/2015 | Truong | A63B 21/0414 482/4 |
| 2017/0056711 | A1* | 3/2017 | Dalebout | A61B 5/6895 |
| 2017/0087434 | A1* | 3/2017 | Coles | G16H 20/30 |
| 2017/0232289 | A1* | 8/2017 | Pouchet | A63B 23/03533 482/93 |
| 2021/0260437 | A1* | 8/2021 | Tsai | A63B 22/0235 |
| 2025/0050164 | A1* | 2/2025 | Ling | A63B 71/0622 |

* cited by examiner

COMBINED ABDOMINAL EXERCISER AND TREADMILL

BACKGROUND OF THE INVENTION

1. Field of the Invention

The present invention relates to an abdominal exerciser and a treadmill and, more particularly, to a combined abdominal exerciser and treadmill that includes a treadmill and an abdominal exerciser apparatus combined, allowing the user to keep a mental and physical wellness, where combined machine is capable of establish a predetermined workout routine by means of a console or a remote control operatively connected to the console.

2. Description of the Related Art

Several designs for a combined abdominal exerciser and treadmill have been designed in the past. None of them, however, include a treadmill with a console that is display operatively connected to a portable device and a control remote, wherein the treadmill includes an abs workout machine where the user may select a plurality of predetermined routines to exercise different muscles of the user's body.

Applicant believes that a related reference corresponds to U.S. Pat. No. 2,017,128 issued for exercising device. Applicant believes that another related reference corresponds to U.S. Pat. No. 9,511,252 issued for collapsible exercise device. None of these references, however, teach of a treadmill with a revolving continuous belt wherein the treadmill includes an attached abdominal exercising assembly Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device which includes predetermined routines that make all the muscles work.

It is another object of this invention to provide a device that helps the user to improve physical and mental health by means of well-prepared workout routines.

It is still another object of the present invention to provide a device that is controlled by a console, a control remote and/or a portable device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
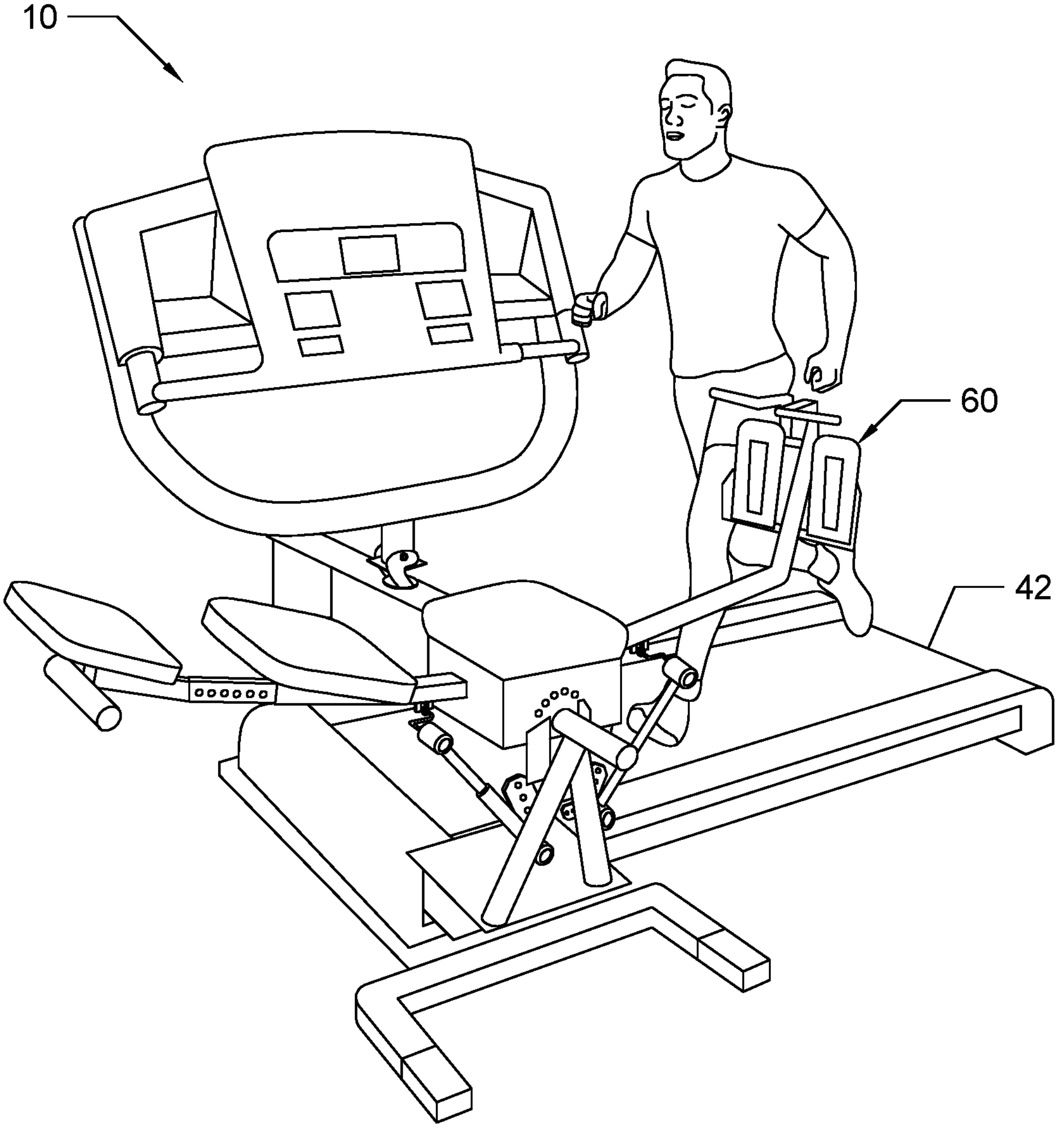
FIG. 1 represents an operational view of an exemplary embodiment of the present invention 10, where the user may choose to walk and/or run on the treadmill 42 and/or choose the oscillating motion assembly 60 to exercise the upper and lower side of the user's body.

Referring now to the drawings, where the present invention is generally referred to with numeral 10, it can be observed that it basically includes a console assembly 20, a treadmill assembly 40, and an oscillating motion assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
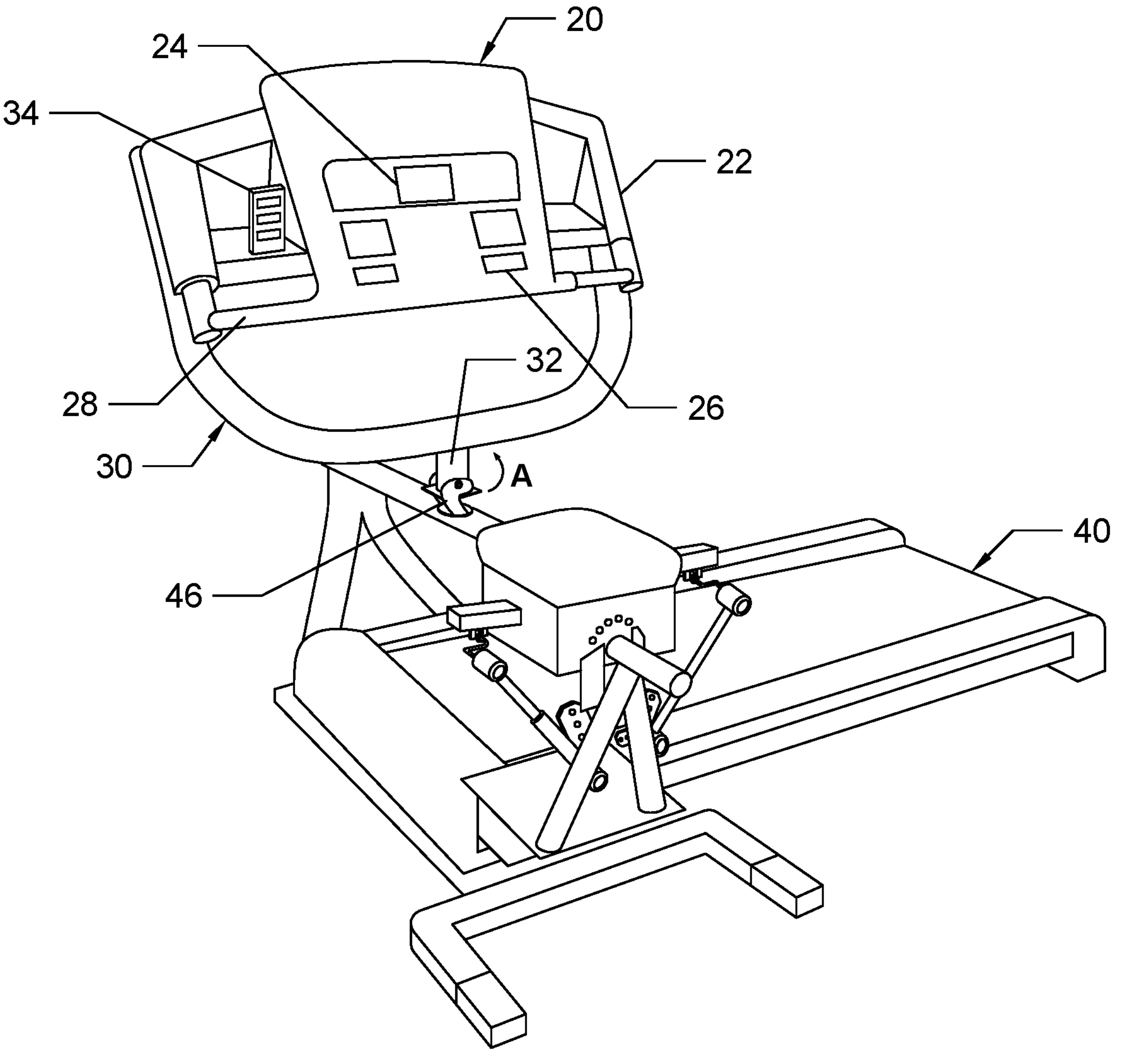
FIG. 2 shows an isometric view of the console assembly 20 coupled to the treadmill assembly 40, wherein the console housing 22 may have a rotational motion by means of a rotational bracket 46 attached to the console support 44.

Console assembly 20 includes a console housing 22, a display screen 24, programmable buttons 26, handles 28, a bar support 30, an adjustable bar support 32, a remote controller 34, and a speaker 36. In an exemplary embodiment, the console housing 22 may have a suitable shape to include in a front side thereof the display screen 24, the programmable buttons 26, the speaker 36, wherein storage receptacles may be also considered for the console housing. As FIG. 2 illustrates. It should be considered that the console housing 22 may include wires, electronic elements, and the proper circuitry 37 to operatively connect the foregoing referenced elements. In a suitable embodiment, the display screen 24 may be a touch screen, wherein the user may select the different types of exercise routines. As FIG. 5 represents.

Figure 18:
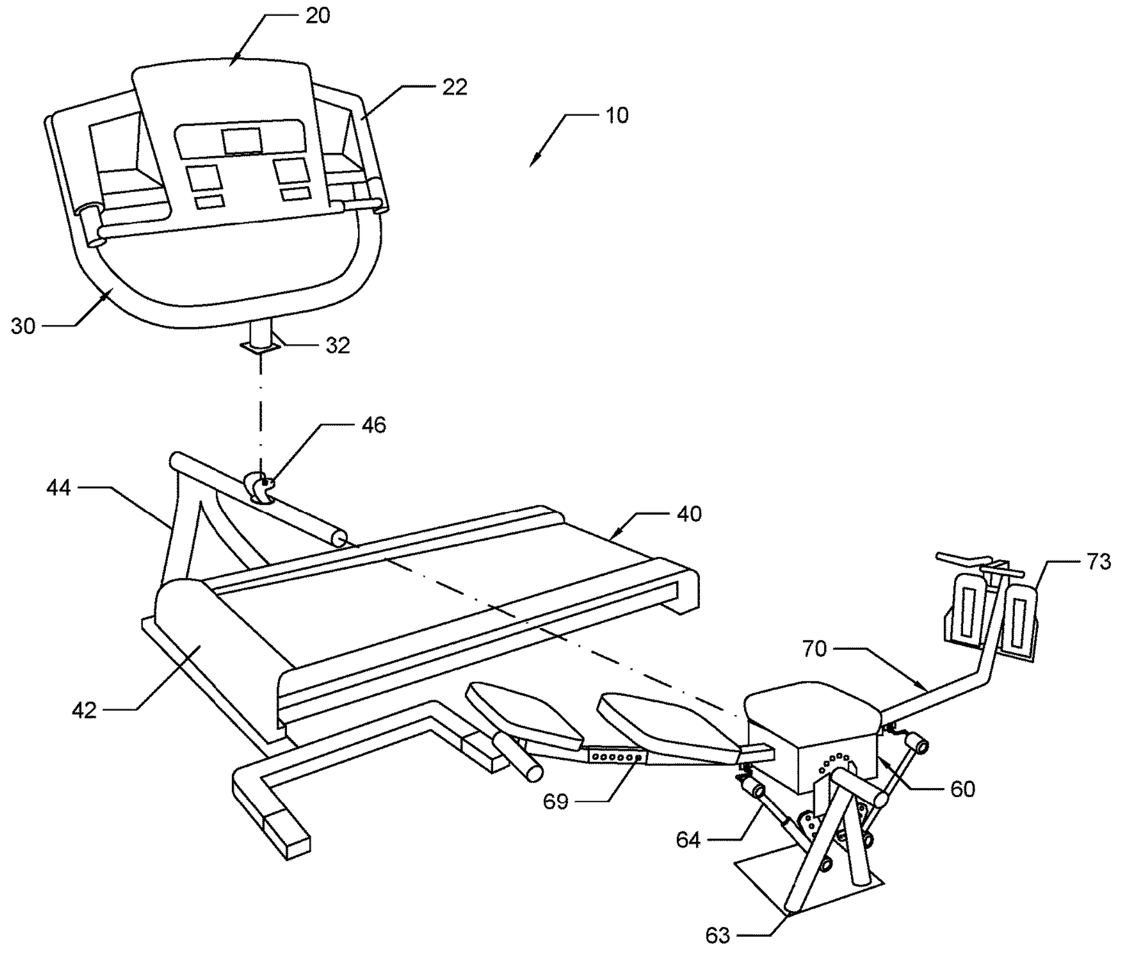
FIG. 18 is a representation of an exploded view of an exemplary embodiment of the present invention 10, wherein the console assembly 20 may be coupled to the treadmill assembly 40 which in turn the oscillating motion assembly 60 is attachable thereof.
Figure 19:
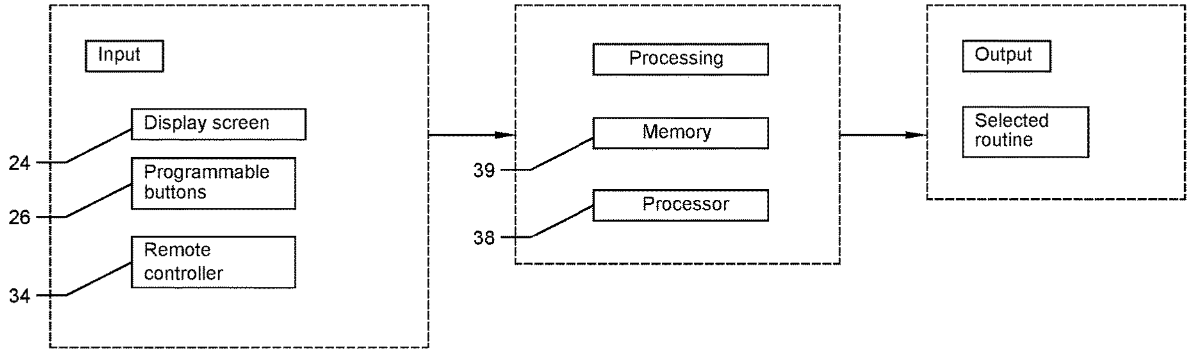
FIG. 19 depicts a block diagram of the input, processing and output data that allows the user to operate the present invention 10.

The circuitry 37 may include a processor 38 and a memory 39 that contains instructions that are readable by the processor. The programmable buttons 26, the remote controller 34 and the display screen 24 may be electrically connected to said processor 38. The memory may include exercise routines that can be accessed and selected by means of the console assembly 20. Based on the user's input, the circuitry 37 may cause the present invention to be used in compliance with the selected routine. As FIG. 18 illustrates.

Figure 5:
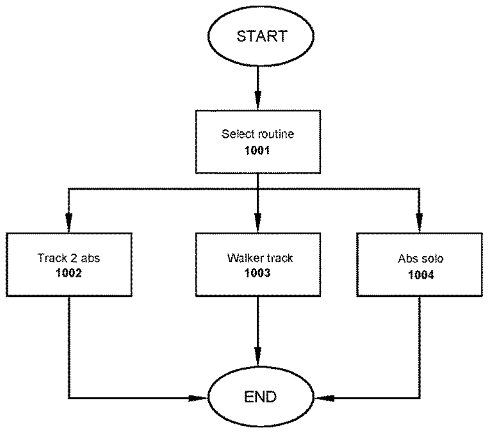
FIG. 5 is a flow chart of an embodiment of an exercising routine selectable from the display screen 24.

FIG. 5 illustrates an example of a method to select routine 1001, wherein the user may select from the display screen 24 various selectable exercise routines: Track 2 abs 1002, walker Track 1003, and Abs solo 1004. In a suitable variation, the display screen 22 may be actuated by means of said programmable buttons.

In a suitable embodiment the handles 28 may be integrally formed with the console housing 22 at the bottom edge thereof, as FIG. 2 depicts, wherein the handles 28 may be tubular supports, or any other suitable ergonomic variation adapted to be gripped by the user's hand. It should be considered that the handles 28 may include a pulse heart rate sensor operatively connected to the display screen 24 to measure a user's heart rate. In a preferred embodiment, the bar support 30 may be a U-shaped tube attached to a portion of the rear side of the console housing 22, wherein the bar support 30 provides oscillating motion support 63 to the console housing 22 when coupled to the treadmill assembly 40. As best depicted in FIG. 2. In one embodiment, the adjustable bar support 32 may be an adjustable in height tube attached to a central bottom portion of the bar support 32. As shown in FIG. 2. The Adjustable bar support 32 may include a suitable mechanism that allows the bar support 30 with the console housing 22 to be adjusted in a predetermined height as the user may prefer. In other embodiment, the remote controller 34 may be operatively connected to the display screen 24 and the circuitry included in the console housing 22 by means of a wireless connection, wherein the remote controller 34 may include a plurality of buttons that actuate the treadmill assembly 40 and/or the oscillating motion assembly 60 as the user may consider appropriate. In a suitable embodiment, the speaker 36 may be operatively connected to an external device such as a mobile phone well known in the art or the like by means of a wireless connection, thereby the user may play a predetermined digital audio through the speaker 36. It should be considered that the console assembly 20 may include wireless connection to the internet, thereby the user may play a predetermined digital video and/or background through the display screen 24 and speaker 36.

Treadmill assembly 40 includes a treadmill 42, a console support 44, and rotational bracket 46. In an exemplary embodiment, the treadmill 42 may be a treadmill well known in the art, wherein the circuitry included in the treadmill 42 may be operatively connected with the circuitry of the console assembly 20, thereby the user may control the treadmill 42 by means of the display screen 24 and/or the remote controller 34.

Figure 7:
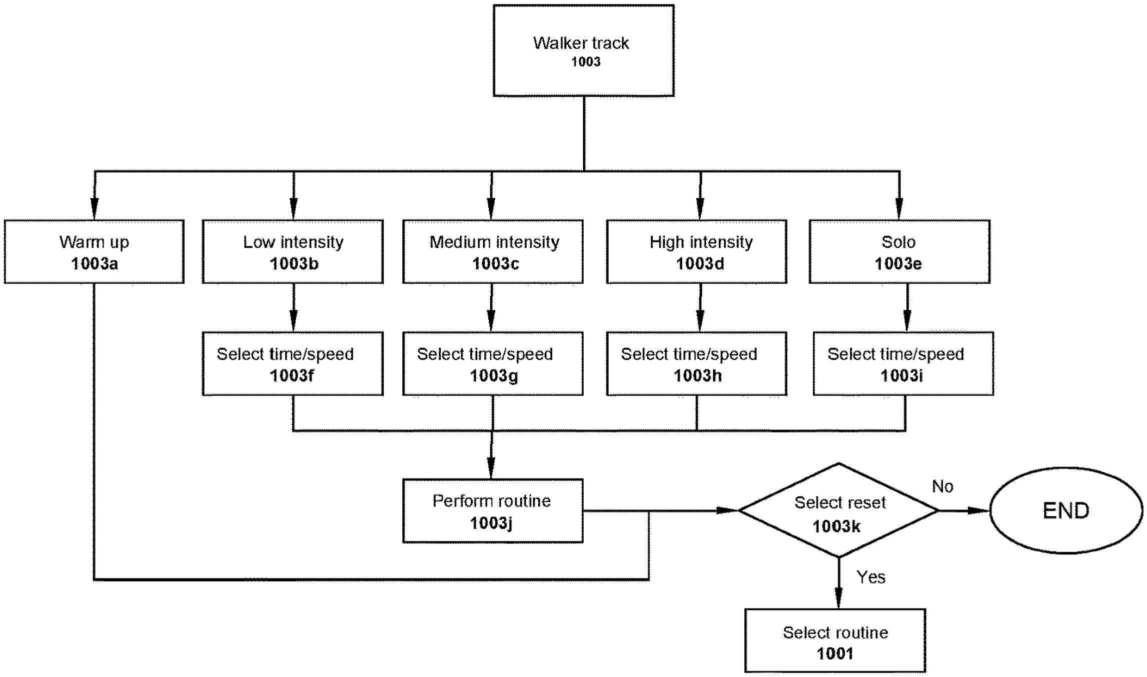
FIG. 7 is a flow chart of the selectable options when the walker track 1003 routine is selected.

Referring to FIG. 7, the Walker tracker 1003 routine selected from the referenced select routine 1001, the display screen 24 may display various selectable option according to the walker track 1003 routine that allows the user to walk, run or climb according to the following options: Warm up **1003*a* may be configured with a predetermined set up time of 10 minutes, wherein the running belt of the treadmill 42 may move with a predetermined speed, wherein after said 10 minutes, the running belt may slow down the speed until stop. It should be considered that the set-up time may be modified by the user by means of the display screen 24 and/or the remote controller 34**.

After the Warm up **1003*a* routine of the treadmill 42, the display screen 24 may display select reset 1003*k* to end routine or to return to select routine 1001 display, thereby the user may continue using the walker tracker 1003 routine, which further includes the following selectable options: Low intensity 1003*b* for slow walking, wherein the user may further select time/speed 1003*f*, thereby the user may select a predetermined time and a speed from 1 to 4, then the user may perform the routine 1003*j* according to the configurations selected until finish, thus the user may select reset 1003*k* to start a new routine or end the exercise. Medium intensity 1003*c* for walking and/or jogging, wherein the user may further select time/speed 1003*g*, thereby the user may select a predetermined time and a speed from 5 to 8, then the user may perform the routine 1003*j* according to the configurations selected until finish, thus the user may select reset 1003*k* to start a new routine or end the exercise. High intensity 1003*d* for running, wherein the user may further select time/speed 1003*h*, thereby the user may select a predetermined time and a speed from 9 to 12, then the user may perform the routine 1003*j* according to the configurations selected until finish, thus the user may select reset 1003*k* to start a new routine or end the exercise. Solo 1003*e*, wherein the user may select time/speed 1003*i* with a predetermined time and a predetermined speed from 1 to 12 in order to perform routine 1003*j*, thus the user may select reset 1003*k* to start a new routine or end the exercise. It should be considered that the user may increase and/or decrease the speed of the running belt of the treadmill 42 during the walker track 1003 routine by means of the programmable buttons, the display screen 24 and/or the remote controller 34. It is also to be considered that the running belt of the treadmill may be inclined as the user may consider it appropriated by means of the programmable buttons, the display screen 24 and/or the remote controller 34. In a preferred embodiment, the walker track 1003 routine may be stopped as the user may consider it appropriated by means of the programmable buttons, the display screen 24 and/or the remote controller 34**.

Figure 3:
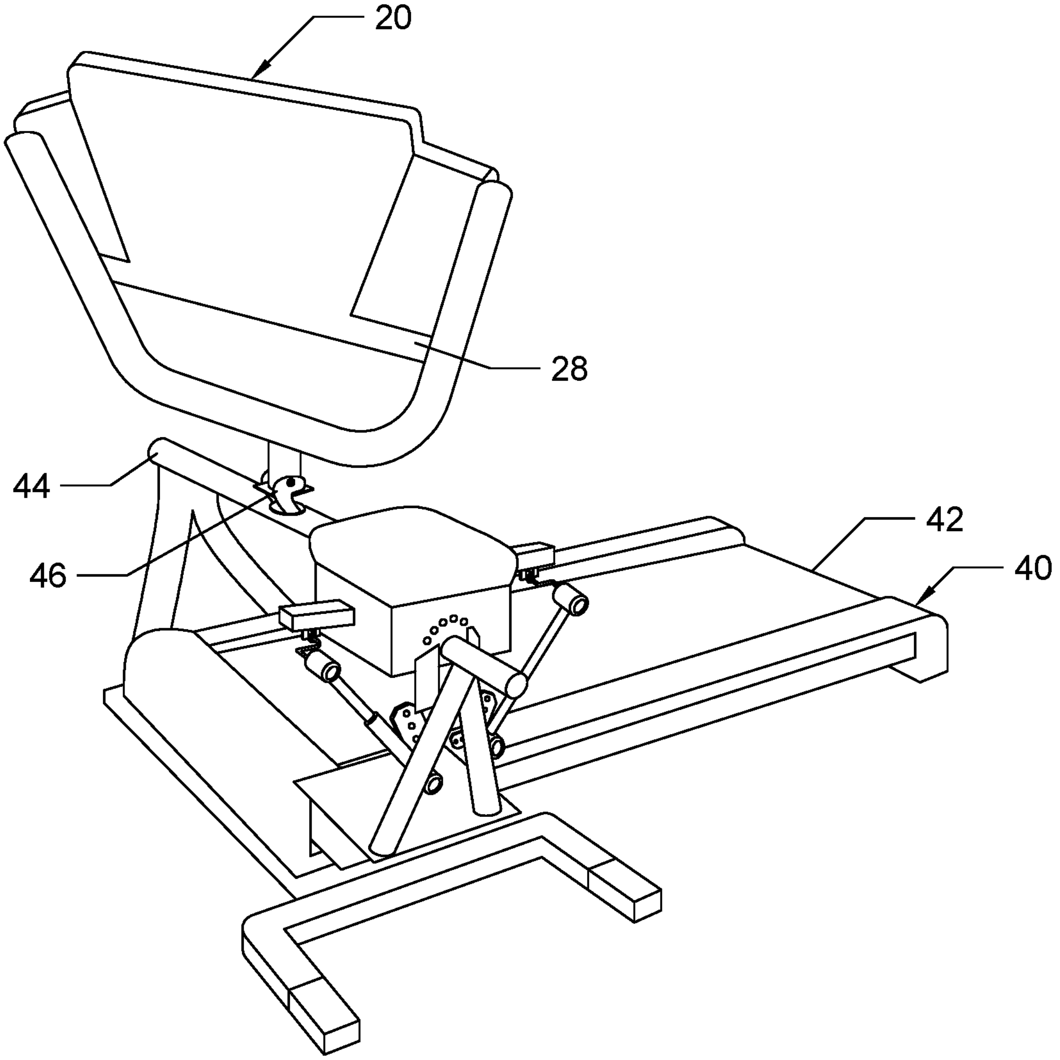
FIG. 3 illustrates an isometric view of the console assembly 20 coupled to the treadmill assembly 40, wherein the console assembly 20 is oriented in a perpendicular position with respect to the treadmill 42, thereby the user may grab the handles 28 for support or selecting the routine when walking.

In a suitable embodiment, the console support shown in FIG. 3 may be a metal structure that supports the console assembly 20 by means of the rotational bracket 46. The console support 44 may be attached to a lateral side of the treadmill 42 by means of a tubular structure, a square structure, rectangular structure, or any other suitable structure made of metal or the like, wherein at the opposite side, the console support 44 may be removably attachable to the oscillating motion assembly 60. The console support may extend above the motor cover of the treadmill, wherein the console housing 22 may have a rotational degree of freedom by means of the rotational bracket, allowing the user to turn the console housing 22 parallel with respect to the treadmill 42 towards the oscillating motion assembly 60 or perpendicular with respect to the treadmill 42. As best depicted in FIGS. 2 and 3 respectively. In a preferred embodiment, the rotational bracket 46 may be a rotating mechanism such as rotating mounting bracket, a swivel bracket or any other suitable mechanism that allows the housing 22 to rotate around the vertical axis of the rotational racket 46.

Figure 4:
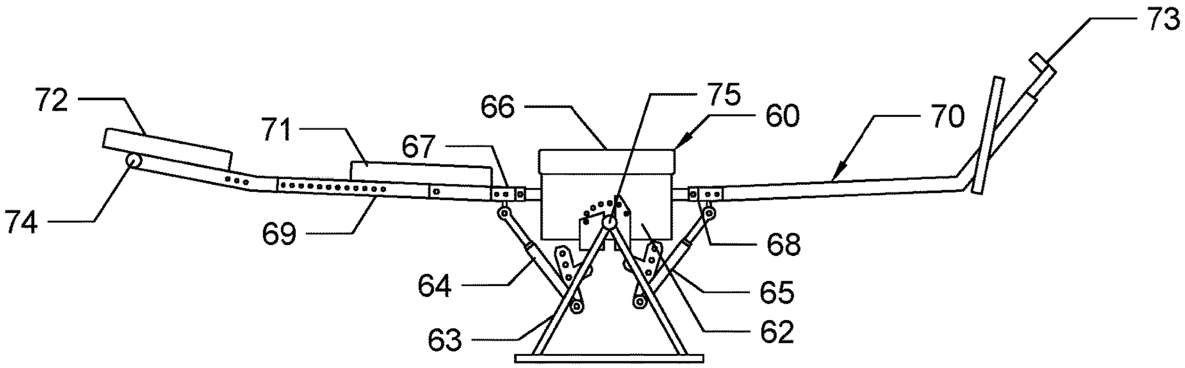
FIG. 4 is a representation of a frontal view of the oscillating assembly 60, wherein the upper side and lower side of the user's body may be exercised in an upper and lower motion by means of the upper oscillating motion mechanism 64 and the lower oscillating motion mechanism 65 according to a predetermined routine.
Figure 10:
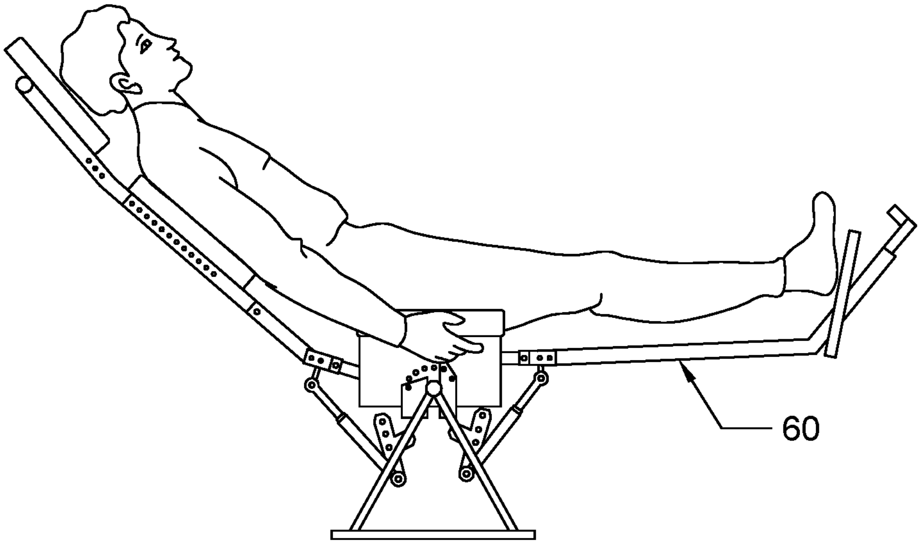
FIG. 10 is a front view of the oscillating motion assembly 60 in a standby position, thereby the user may lie on thereof to start a predetermined routine as step 1013 describes.
Figure 16:
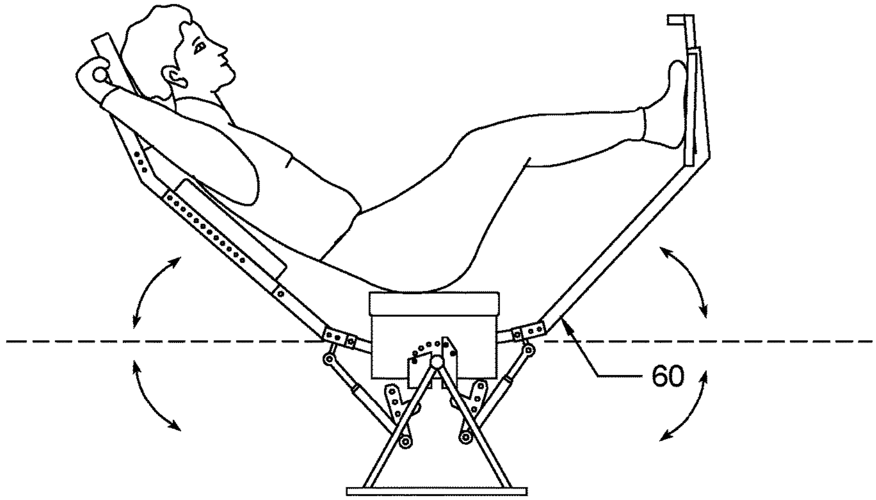
FIG. 16 is a front view of the oscillating motion assembly 60 showing an upper and lower body with upper and lower motion and a left to right swing as step 1073 describes.

Oscillating motion assembly 60 including a housing 62, an oscillating motion support 63, an upper oscillating motion mechanism 64, a lower oscillating motion mechanism 65, a housing cushion 66, an upper connector 67, a lower connector 68, an upper extension bar 70, a back cushion 71, a head cushion 72, pedals 73, upper handles 74, housing handles 75 and a vibration member. In an exemplary embodiment, the housing 62 may be a removably attachable to the treadmill 42 be means of the console support 44, wherein the housing 62 may include a oscillating motion support 63 that may be attached to the opposite lateral side of the treadmill with respect to the console support 44, thereby said oscillating motion support 63 may hold in place the housing 62 in a predetermined height. The housing 62 may be a suitable hollow frame which is included in a top side thereof a housing cushion that is configured to receive the user. As FIG. 10 depicts. In a suitable embodiment, the housing 62 may include housing handles 75 in a front side and a rear side thereof, as FIG. 4 illustrates, wherein said housing handles 75 may have an ergonomic shape to be grabbed but the user's hand. In a preferred embodiment, the housing 62 further includes openings at the lateral sides thereof, wherein a portion of the upper connector 67 and the lower connector 68 pass through said openings, where a distal end thereof is configured to be coupled to a mechanism inside the housing 62 that allows the upper connector 67 and the lower connector 68 to have a rotational degree of freedom. In a preferred embodiment, the upper connector 67 and the lower connector 68 may be coupled to the upper oscillating motion mechanism 64 and the lower oscillating motion mechanism 65 respectively by means of a rotatory motion connector (not shown in figures), thereby the rotatory element of each upper oscillating motion mechanism 64 and lower oscillating motion mechanism 65 may convert the rotatory motion into an oscillating motion of the upper connector 67 and the lower connector 68. As FIG. 13 demonstrates. It should be considered that said rotatory motion is driven by means of a mechanical coupling (not shown in figures) to the motor of the treadmill 42, wherein said mechanical coupling may engage and disengage according when Track 2 Abs 1002 and Abs solo 1004 is selected. In a suitable embodiment, the circuitry of the console assembly 20 and/treadmill assembly 40 may disengage the mechanical coupling when the running belt of the treadmill 42 is being used, preventing the oscillating motion assembly 60 to be actuated, and said circuitry may be disengaged from the running belt to be engaged to the mechanical coupling to transfer the rotatory motion to the motor to upper oscillating motion mechanism 64 and the lower oscillating motion mechanism 65. In a suitable variation. The oscillating motion of the upper connector 67 and the lower connector 68 may be transmitted by a suitable mechanism driven by an independent motor operatively connected to the console assembly/and or the treadmill assembly 40, thereby said motor and/or plurality of motors coupled to the upper connector 67 and the lower connector 68 may transmit said rotational motion with a predetermined angle of oscillation, taking as a reference FIG. 16.

In one embodiment, the upper connector 67 and the lower connector 68 may include a mechanical joint respectively (not shown in figures) that allows a swing movement such as oscillating motion with respect to the lateral axis of the upper connector 67 and the lower connector 68, thereby said lateral oscillating motion may be transmitted to the upper extension bar 69 and the lower extension bar 70. In a suitable embodiment, the distal end of the upper extension bar 69 and the lower extension bar 70 are hingedly coupled to a proximal end of the upper connector 67 and the lower connector 68 respectively, wherein the upper extension bar 69 and the lower extension bar 70 may be expandable by means of an expandable mechanism, such as a telescopic mechanism or the like, wherein said expandable mechanism may include a series of longitudinal displaced holes secured by a pin. As best depicted in FIG. 4. The upper extension bar 69 may include attached in a top portion thereof the back cushion 71, wherein said back cushion 71 may be a square frame with a cushion on top that is configured to receive the back of the user. As FIG. 10 represents. The user may adjust the upper extension bar 69 and the lower extension bar 70 in a predetermined length by means of the expandable mechanism respectively and be held in place by means of said pin. In a preferred embodiment, the upper extension bar 69 may include an inclined proximal end where on a top portion thereof the head cushion 72 is attached, wherein the head cushion 72 may be a square frame with a cushion on top that is configured to receive the head of the user. As FIG. 10 illustrates. It should be considered that the head cushion 72 may be hingedly coupled to the upper extension bar 69, thereby the head cushion 72 may be adjusted in a predetermined length as the user may consider appropriate, where the head cushion 72 may rotate bye in a predetermined angle in conjunction with the neck and head of the user when performing the routine. In a suitable embodiment, the upper extension bar 69 further includes upper handles 74 in a front and a rear portion thereof, as shown in FIG. 4, wherein the upper handles 74 may have an ergonomic shape to be grabbed by the user's hand. It should be considered that the upper extension bar 69 and the upper connector 67 may be hingedly attached therebetween, said hinged connection may allow the upper extension bar 69 in conjunction with the back cushion 71 to have a predetermined rotational motion according to the inclination of the user's back according to each routine.

In one embodiment, the lower extension bar 70 may include in a proximal end thereof the pedals 73 wherein said lower extension bar 70 may have an inclined portion, as best illustrated in FIG. 18, where the pedals are attached by means of a sleeve that allows the pedals 73 to have a predetermined rotational motion in conjunction with user's feet while the oscillating motion of the lower oscillating motion mechanism is moving up and down. The pedals 73 may have a suitable shape to receive the user's feet, whereas the pedals 73 may have a predetermined inclination with respect to the horizontal plane that allows the user's feet to be placed. As FIG. 10 demonstrates. It should be considered that the pedals 73 may be made of plastic, rubber, metal, or any other suitable material which includes a frame that allows the pedals 73 to provide support against the force applied by means of the user's feet weight. It should be considered that the pedals 73 may include a support for the instep of the user's feet.

In a suitable embodiment, the vibration member 76 (not shown in the figures) attached to at least one of the elements comprised of said oscillating motion assembly 60, may transmits a periodic back-and-forth motion to the housing cushion 66, upper extension bar 69, and the lower extension bar 70 when select vibrator 100*h* is selected. It should be considered that the vibration member 76 may be an electrical element well known in prior art operatively connected to the console assembly 20 and/or treadmill assembly 40, although a mechanical element should be considered.

Figure 6:
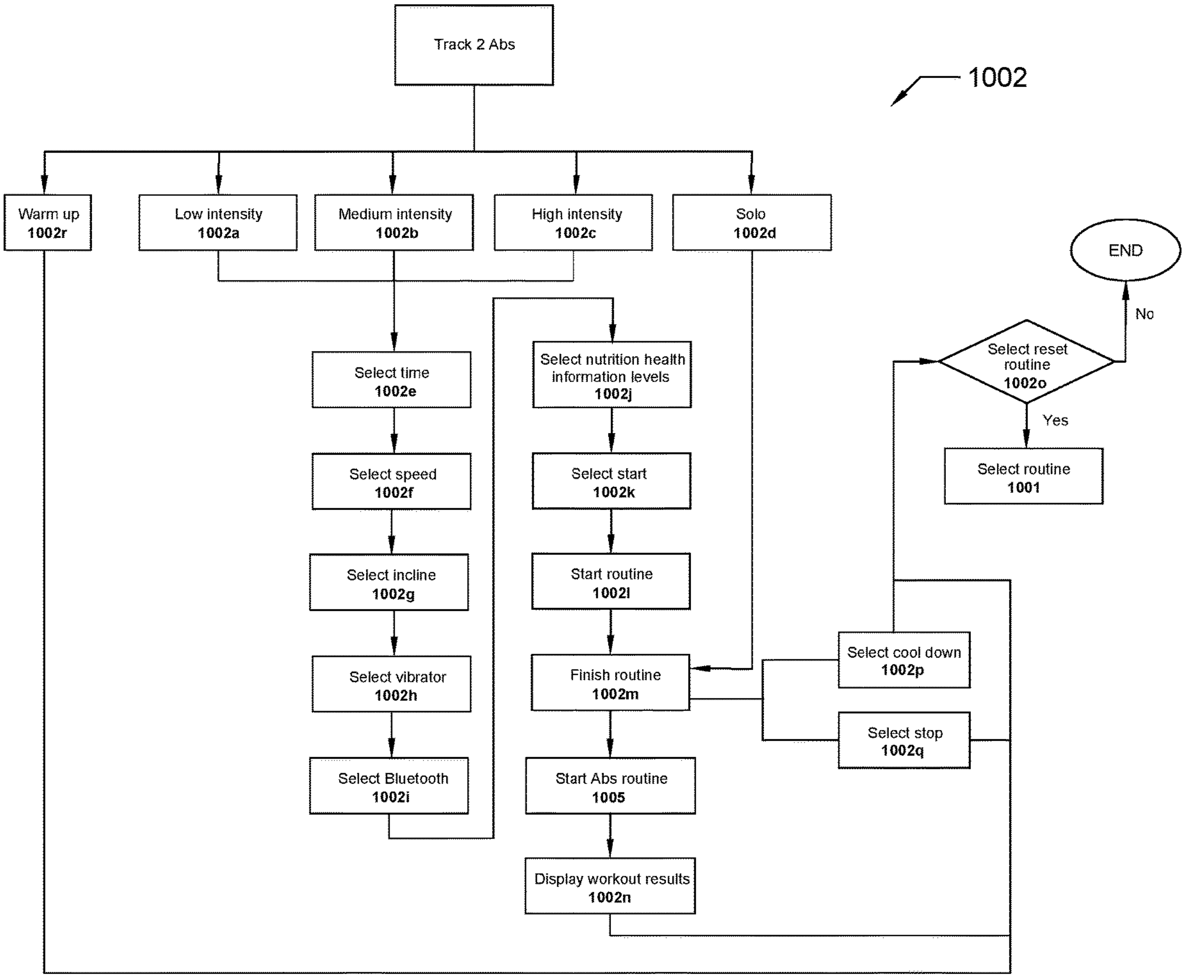
FIG. 6 is a flow chart of the selectable options when Track 2 abs 1002 routine is selected.

Referring to FIG. 6, when track 2 Abs 1002 is selected, the user may have the following options prior perform an exercising routine: warm up 1002*r*, where the running belt of the treadmill 42 is configured to start moving with a predetermined speed during a predetermined period, then a period of cooling down start where the running belt may slow down the until stop, thus the user may select reset routine 1002*o* wherein Select routine 1001 may be displayed, or the user may end the exercising routine. Low intensity 1002*a* for slow walking, Medium intensity 1002 for jogging, high intensity 1002*c* for running, wherein the user may further select time 1002*e*, Select Speed 1002*f* from 1 to 4 for low intensity 1002*a*, 5-8 for medium intensity 1002*b*, 9-12 for high intensity 1002, Select incline 1002*g* from the horizontal plane to a predetermined angle of inclination, select vibrator 1002*h* to actuate the vibration member 76, select Bluetooth 1002*i* to pair the display screen with the external device wirelessly, select nutrition health information levels 1002*j*, wherein the user may introduce information such as weight, height, age, or the like, select start 1002*k* to perform the exercising routine on the treadmill 42, Finish routine 1002*m* may include the following options: select stop 1002*q* where the user may select reset routine 1002*o* to star routine 1001 or end routine, and select cool down 1002*p* to slower the speed of the running belt of the treadmill 44 until stop to then start Abs routine 1003. After performing Abs Routine 1003, the display screen 24 may display workout results 1002*n* such as weight, distance, carbohydrates, time, inclination, body pressure, cholesterol, fluids, speed, height, calories, pace, heart rate, glucose, hydrates, and the like, wherein said results may be expressed in percentage and/or decimals in imperial or metric units according to the calculation between the time, inclination, speed, heart rate, and health information levels introduced, then the user may select reset routine 1002*o* to start routine 1001 or end exercise routine. Solo 1002*d* may allow the user to select the time, speed, and inclination as the user may consider it appropriate, wherein the user may change the time, speed, and inclination by means of the programmable buttons 26, display screen 24 and/or controller remote. In a suitable variation, the remote controller may include the preconfigured track 2 Abs 1002, Walker track 1003 and Abs solo 1004 routines, thereby the user may press a predetermined button to start the routines previously mentioned.

Figure 8:
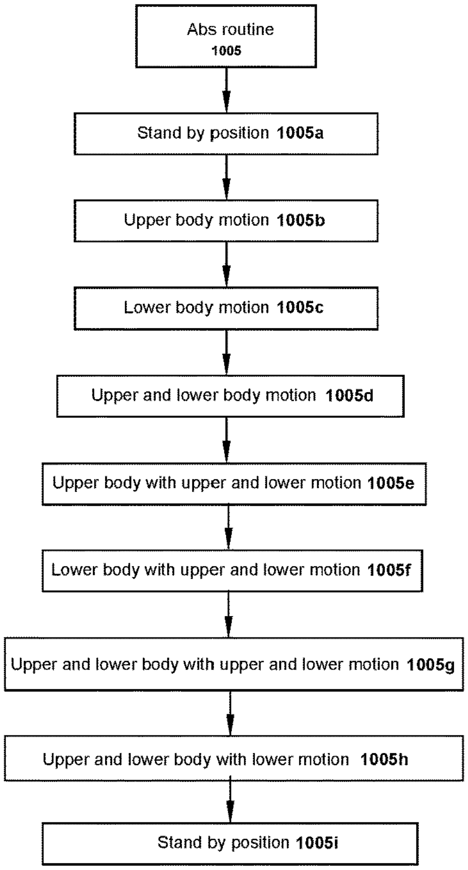
FIG. 8 is a block diagram of the abs routine 1005 when Track 2 abs 1002 routine is selected.
Figure 11:
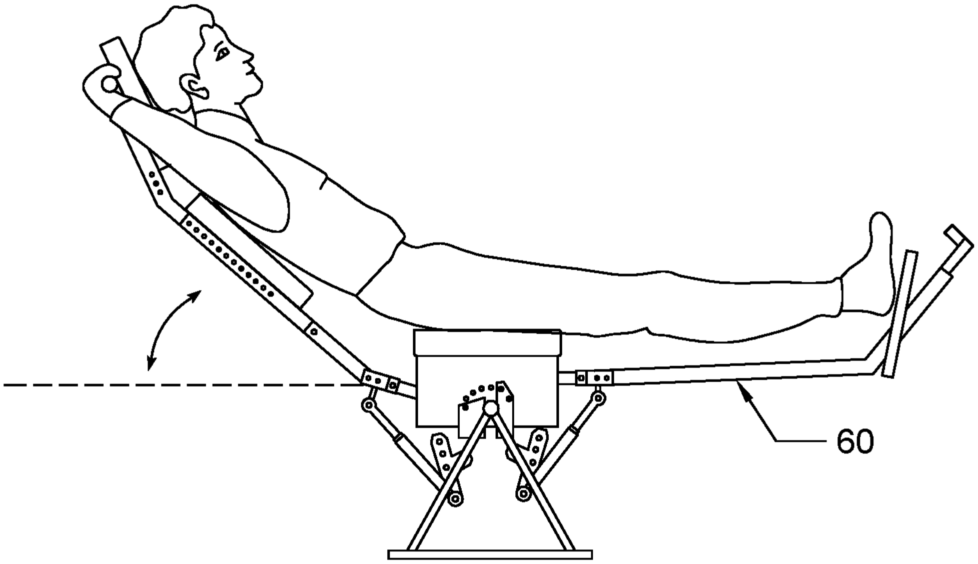
FIG. 11 is a front view of the oscillating motion assembly 60 showing an upper body motion as step 1023 describes.
Figure 12:
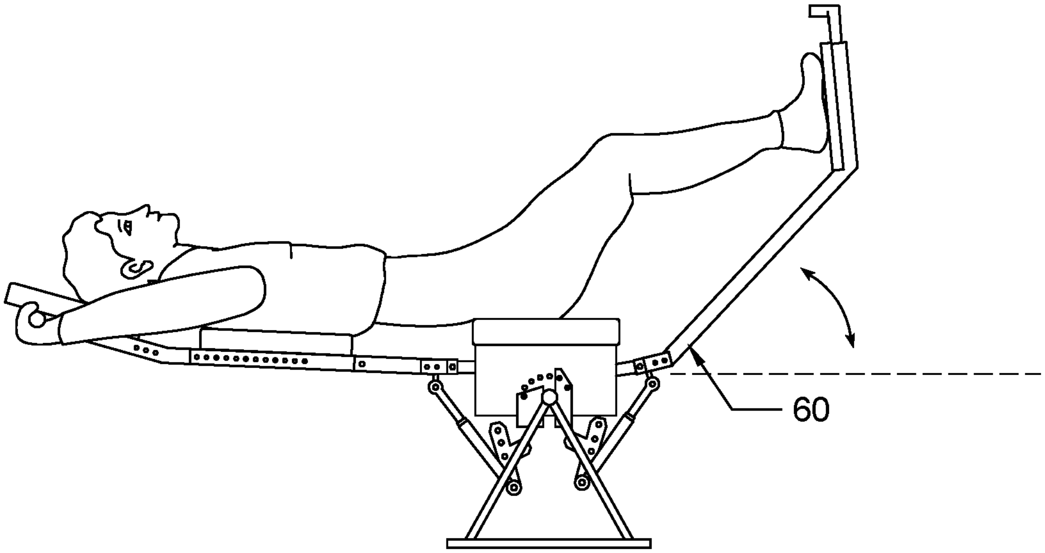
FIG. 12 is a front view of the oscillating motion assembly 60 illustrating a lower body motion as step 1033 describes.
Figure 13:
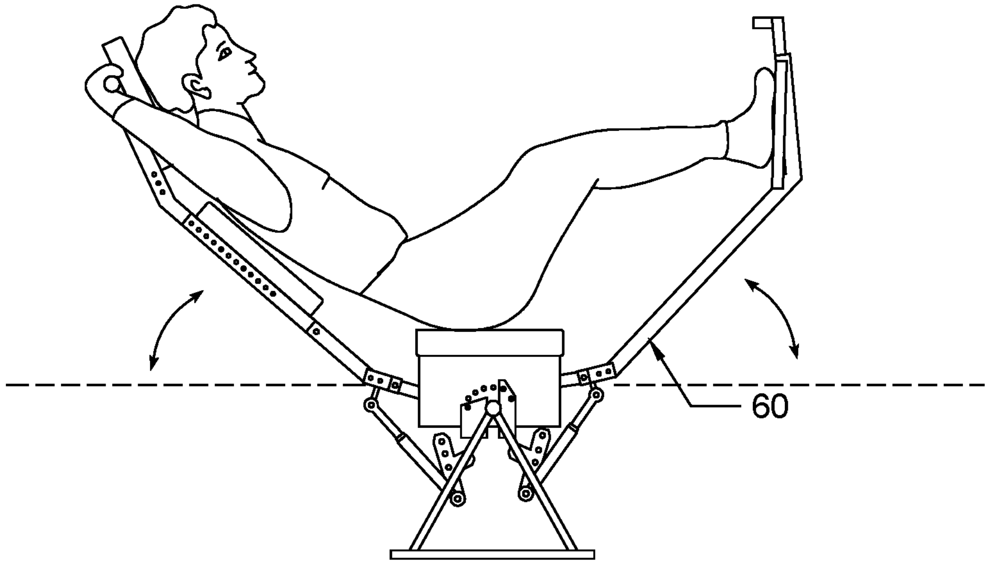
FIG. 13 is a front view of the oscillating motion assembly 60 representing an upper body and a lower body motion as step 1043 describes.
Figure 14:
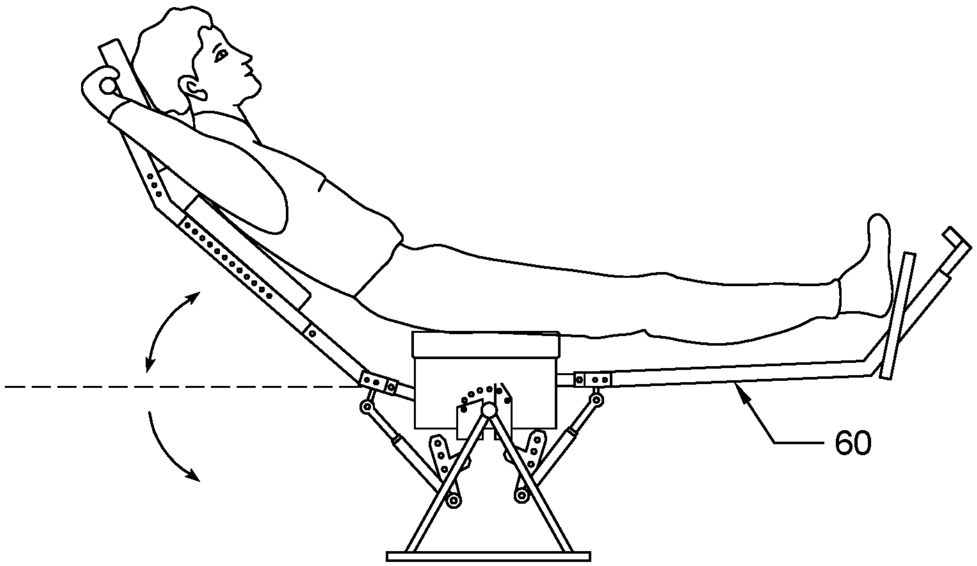
FIG. 14 is a front view of the oscillating motion assembly 60 depicting an upper body with upper and lower motion as step 1053 describes.
Figure 15:
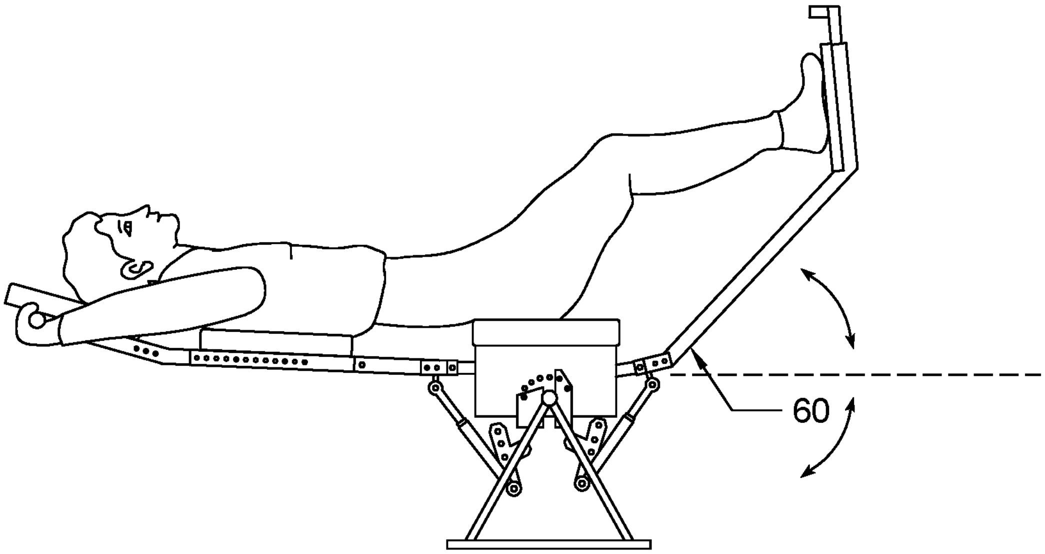
FIG. 15 is a front view of the oscillating motion assembly 60 representing a lower body with upper and lower motion as step 1063 describes.
Figure 17:
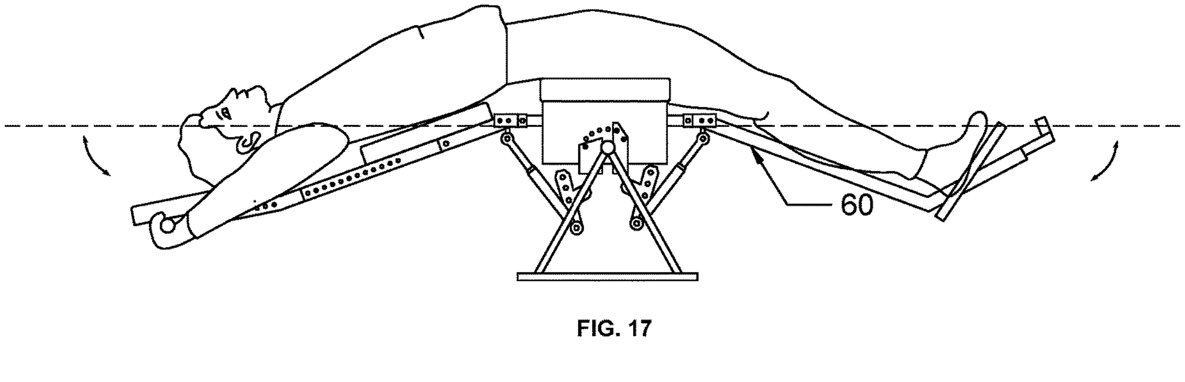
FIG. 17 is a front view of the oscillating motion assembly 60 illustrating an upper and lower body with a lower motion as step 1083 describes.

Referring to FIG. 8, the Abs routine 1005 may actuate the oscillating motion assembly 60, wherein the first step is comprised of a standby position 1005*a* that may secure the upper extension bar 69 in a predetermined inclined position from 0 up to 90 degrees and a horizontal position for the lower extension bar 70 for a predetermined period so the user may accommodate on the housing cushion 66, the back cushion 71, the head cushion 72, and the pedals 73. As FIG. 10 illustrates. A second step consists of the upper body motion 1005*b*, wherein the upper extension bar 69 may have a predetermined oscillation motion from 0 up to 45 degrees for 1 minute. As FIG. 11 represents. Step 3 consists of the lower body motion 1005*c*, wherein the upper extension bar 69 may rest in a horizontal position and the lower extension bar 70 may have a predetermined oscillating motion from 0 up to 45 degrees for 1 minute. As shown in FIG. 12. A step fourth consists of an upper and lower body motion 1005*d*, wherein the upper extension bar 69 may have a predetermined oscillation motion from 0 up to 45 degrees and the lower extension bar 70 may have a predetermined oscillating motion from 0 up to 45 degrees for 2 minutes. As best illustrated in FIG. 13. A fifth step is comprised of the Upper body with upper and lower motion 1005*e*, wherein the lower extension bar 70 may rest in a horizontal position and the upper extension bar 69 may have a predetermined oscillating motion from 0 up to 90 degrees considering 45 degrees below the horizontal plane and 45 degrees above the horizontal plane with a swing movement for 1 minute. As FIG. 14 depicts. A sixth step is comprised of the lower body with upper and lower motion 1005*f*, where the upper extension bar 69 may rest in a horizontal position and the lower extension bar 70 may have a predetermined oscillating motion from 0 up to 90 degrees considering 45 degrees below the horizontal plane and a predetermined oscillating motion for the lower extension bar 70 from 0 up to 45 degrees above the horizontal plane and 0 up to 45 degrees below the horizontal plane with a swing movement for 1 minute. As FIG. 15 represents. A seventh step is comprised of the upper and lower body with upper and lower motion 1005*g*, wherein the upper extension bar 69 and the lower extension bar 69 may have a symmetrical oscillating motion from 0 up to 90 degrees considering 45 degrees above the horizontal plane and 45 degrees below the horizontal plane for the upper extension bar 69 and a predetermined oscillating motion up to 90 degrees for the lower extension bar 70 considering up to 45 degrees above the horizontal plane and 45 degrees below the horizontal plane with the swing movement for 2 minutes. As FIG. 16 demonstrates. An eight step consists of the upper and lower body with lower motion 1005*h*, wherein the upper extension bar 69 and the lower extension bar 70 may have an oscillating motion from the horizontal plane to the angle of inclination of 15 or 20 degrees below the horizontal plane for 2 minutes. As best illustrated in FIG. 17. A ninth step consists of the standby position 1005*i*, wherein the lower extension bar 70 may rest in a horizontal position and the upper extension bar 69 may rest in an angle of inclination of 45 degrees.

Figure 9:
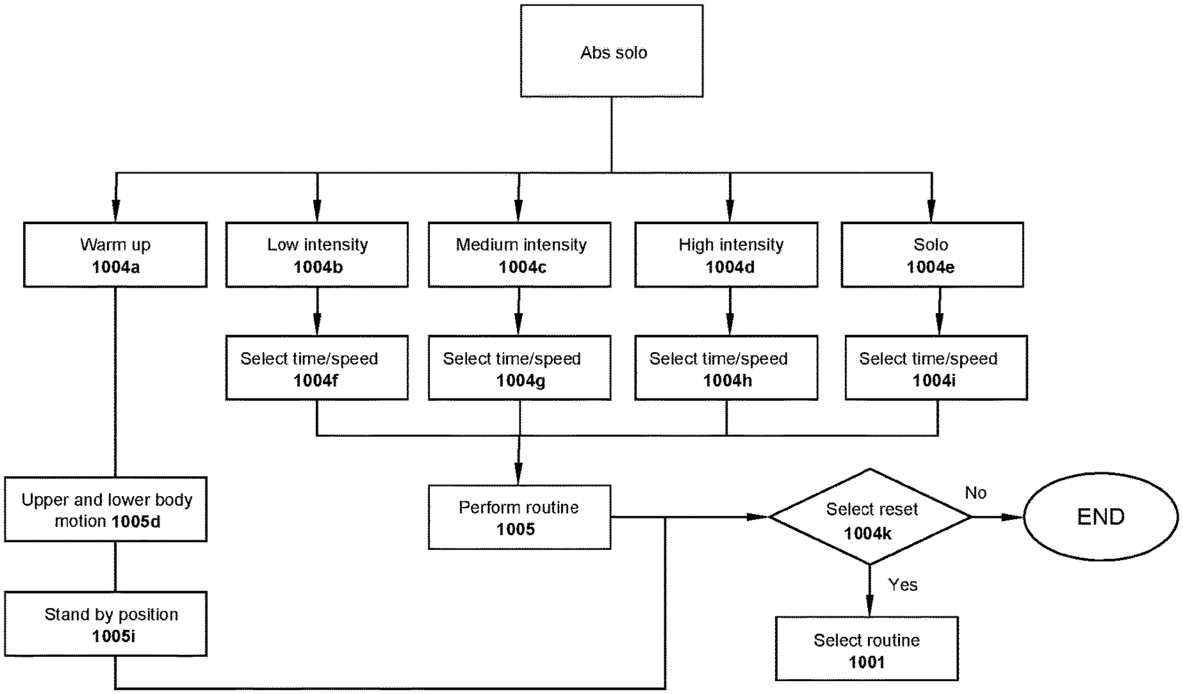
FIG. 9 is a flow chart of the selectable options when Abs solo 1004 routine is selected.

Referring to FIG. 9, the Abs solo 1004 routine selected from the referenced select routine 1001, the display screen 24 may display various selectable option according to the Abs solo 1004 routine that allows the user moderate the exercising routine according to the following options: Warm up 1004*a* may be configured with a predetermined set up time of 7 minutes of workout and 3 minutes of cool down, wherein the upper and lower body motion 1005*d* may be performed, after the set up time, the standby position may be performed 1005*j*. It should be considered that the set-up time may be modified by the user by means of the display screen 24 and/or the remote controller 34.

After the Warm up 1004*a* routine, the display screen 24 may display select reset 1004*k* to end routine or to return to select routine 1001 display, thereby the user may continue performing the Abs solo 1004 routine, which further includes the following selectable options: Low intensity 1004*b* for slow aerobic exercise, wherein the user may further select time/speed 1003*f*, thereby the user may select a predetermined time and a speed from 1 to 2, then the user may perform the routine 1005 according to the configurations selected until finish, thus the user may select reset 1004*k* to start a new routine or end the exercise. Medium intensity 1004*c* for semi-fast motion, wherein the user may further select time/speed 1004*g*, thereby the user may select a predetermined time and a speed from 2 to 4, then the user may perform the routine 1005 according to the configurations selected until finish, thus the user may select reset 1004*k* to start a new routine or end the exercise. High intensity 1004*d* for super-fast motion, wherein the user may further select time/speed 1004*h*, thereby the user may select a predetermined time and a speed from 4 to 6, then the user may perform the routine 1004*j* according to the configurations selected until finish, thus the user may select reset 1004*k* to start a new routine or end the exercise. Solo 1004*e*, wherein the user may select time/speed 1004*i* with a predetermined time and a predetermined speed from 1 to 6 in order to perform routine 1005, thus the user may select reset 1004*k* to start a new routine or end the exercise. It should be considered that the user may increase and/or decrease the speed of oscillating motion assembly 60 by means of the programmable buttons, the display screen 24 and/or the remote controller 34. It is also to be considered that. In a preferred embodiment, the Abs solo 1004 routine may be stopped as the user may consider it appropriated by means of the programmable buttons, the display screen 24 and/or the remote controller 34.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A combined abdominal exerciser and treadmill, comprising:

a console assembly including a console housing, a display screen, programmable buttons, handles, a bar support, an adjustable bar support, a remote controller, and a speaker, wherein said console housing has a hollow body where inside therein includes a circuitry to operatively connect an actuate said display screen, said programmable buttons, and said speaker, said remoter controller is wirelessly connected, said console housing includes storage receptacles in a front side thereof, said display screen and said programmable buttons and said speaker are placed in a front side thereof, said handles are placed in a bottom side of said housing console, wherein said handles have and ergonomic shape that protrudes from said bottom said, wherein said handles are adapted to be grabbed by the user's hands, said bar support is attached to the rear side of the housing console, wherein said bar support provides a means of support for the housing console, said adjustable support is attached to a bottom edge of said bar support, wherein said adjustable bar support is adjustable in height;

a treadmill assembly having a treadmill, a console support, and rotational bracket, wherein said treadmill is a device for walking, jogging, running and/or climbing, said console support is attached to a frame of the treadmill where said rotational bracket is attached on a top portion thereof, said rotational adjustable bar support is adapted to be coupled on said rotational bracket, wherein said rotational bracket is a rotating mechanism; and an oscillating motion assembly including a housing, an oscillating motion support, an upper oscillating motion mechanism, a lower oscillating motion mechanism, a housing cushion, an upper connector, a lower connector, an upper extension bar, a lower extension bar, back cushion, a head cushion, pedals, upper handles, housing handles, and a vibration member, wherein said housing is a hollow frame made of a metal material that includes on a top portion said housing cushion und further includes at the laterals thereof a portion of said upper connector and a portion of said lower connector, wherein the other portions of said upper connector and said lower connector extend past said lateral of said housing, said housing is attached to said oscillating motion support, wherein said oscillating motion support is a structural support to hold said housing, said oscillating motion support is removably attachable to said console support, said housing handles are attached to a read side and a front side of said housing, wherein said handles are adapted to be grabbed by said user's hands, said upper oscillating motion mechanism and said lower motion mechanism are oscillating mechanism driven by means of a motor of said treadmill, wherein said upper oscillating motion mechanism and said lower motion mechanism are coupled to said upper connector and said lower connector respectively, said upper extension bar and said lower extension bar are adjustable in length supporting bars coupled to said upper connector and said lower connector respectively, wherein said upper extension bar includes in a center portion thereof said back cushion, said back cushion is adapted to receive a user's back, said upper extension bar includes in a proximal end thereof said head cushion, wherein said head cushion is adapted to receive a user's head, said proximal end further includes in a rear side and a front said thereof said upper handles, wherein said upper handles are ergonomic handles adapted to be grabbed by said user's hands, said vibration member generates vibrations to said housing, said lower connector and said upper connector, said pedals are coupled to a lateral edge of said lower extension bar, wherein said pedals are adapted to receive the user's feet.

2. The combined abdominal exerciser and treadmill of claim 1, wherein said display screen is a touch screen with preconfigured and selectable workout routines.

3. The combined abdominal exerciser and treadmill of claim 1, wherein said display screen allows an external device such as a mobile phone to be wirelessly connected, thereby a user may reproduce digital video and/or music through said display screen and said speakers.

4. The combined abdominal exerciser and treadmill of claim 1, wherein said programmable buttons are configured to interact with said display as increase and decrease a time set up, a speed set up, an inclination set up of said workout routines.

5. The combined abdominal exerciser and treadmill of claim 1, wherein said adjustable bar support is an adjustable in height bar that allows to increase or decrease the height of the housing console.

6. The combined abdominal exerciser and treadmill of claim 1, wherein said remote controller includes configured buttons that allows the user to increase or decrease said time set up, said speed set up, said inclination set up of said workout routines and start/stop a workout routine wirelessly.

7. The combined abdominal exerciser and treadmill of claim 1, wherein said console support is a structural support made of metal which is adapted to support said console assembly.

8. The combined abdominal exerciser and treadmill of claim 1, wherein said upper oscillating motion mechanism and said lower oscillating motion mechanism transmit to said upper extension bar and said lower extension bar a vertical and a swing oscillating motion respectively.

9. The combined abdominal exerciser and treadmill of claim 1, wherein said housing cushion, said back cushion and said head cushion are made of a padded material.

10. The combined abdominal exerciser and treadmill of claim 1, wherein said vibration member is a device that generates vibrations which transmits said vibrations to said housing cushion, said back cushion, said head cushion and said pedals.

11. The combined abdominal exerciser and treadmill of claim 1, wherein said upper oscillating motion mechanism and said lower oscillation motion mechanism are driven by a pulley mechanism coupled to said motor of said treadmill.

12. The combined abdominal exerciser and treadmill of claim 11, wherein said pulley mechanism is attached and detached from said motor by means of a coupling member according to said workout routines.

13. The combined abdominal exerciser and treadmill of claim 1, wherein said handles include a pulse heart rate sensor to measure a user's heart rate.

14. The combined abdominal exerciser and treadmill of claim 1, wherein said lower connector is hingedly coupled to said upper connector, said head cushion is hingedly coupled to said upper extension bar.

15. The combined abdominal exerciser and treadmill of claim 1, wherein said upper connector and said upper extension bar are hingedly attached therebetween, allowing said upper extension bar that is configured to rotate according to the user's back when performing said workout routines.

16. The combined abdominal exerciser and treadmill of claim 1, wherein said lower extension bar is hingedly coupled to said lower connector and said pedals are hingedly coupled to said lower extension bar.

17. A combined abdominal exerciser and treadmill, comprising:

a console assembly including a console housing, a display screen, programable buttons, handles, a bar support, an adjustable bar support, a remote controller, and a speaker, wherein said console housing has a hollow body where inside therein includes a circuitry to operatively connect an actuate said display screen, said programmable buttons, and said speaker, said remoter controller is wirelessly connected, said console housing includes storage receptacles in a front side thereof, said display screen and said programmable buttons and said speaker are placed in a front side thereof, said handles are placed in a bottom side of said housing console, wherein said handles have and ergonomic shape that protrudes from said bottom said, wherein said handles are adapted to be grabbed by the user's hands, said bar support is attached to the rear side of the housing console, wherein said bar support provides a means of support for the housing console, said adjustable support is attached to a bottom edge of said bar support, wherein said adjustable bar support is adjustable in height, wherein said display screen is a touch screen with preconfigured and selectable workout routines, wherein said display screen allows an external device such as a mobile phone to be wirelessly connected, thereby a user may reproduce digital video and/or music through said display screen and said speakers;

a treadmill assembly having a treadmill, a console support, and rotational bracket, wherein said treadmill is a device for walking, jogging, running and/or climbing, said console support is attached to a frame of the treadmill where said rotational bracket is attached on a top portion thereof, said rotational adjustable bar support is adapted to be coupled on said rotational bracket, wherein said rotational bracket is a rotating mechanism, wherein said console support is a structural support made of metal which is adapted to support said console assembly; and an oscillating motion assembly including a housing, an oscillating motion support, an upper oscillating motion mechanism, a lower oscillating motion mechanism, a housing cushion, an upper connector, a lower connector, an upper extension bar, a lower extension bar, back cushion, a head cushion, pedals, upper handles, housing handles, and a vibration member, wherein said housing is a hollow frame made of a metal material that includes on a top portion said housing cushion und further includes at the laterals thereof a portion of said upper connector and a portion of said lower connector, wherein the other portions of said upper connector and said lower connector extend past said lateral of said housing, said housing is attached to said oscillating motion support, wherein said oscillating motion support is a structural support to hold said housing, said oscillating motion support is removably attachable to said console support, said housing handles are attached to a read side and a front side of said housing, wherein said handles are adapted to be grabbed by said user's hands, said upper oscillating motion mechanism and said lower motion mechanism are oscillating mechanism driven by means of a motor of said treadmill, wherein said upper oscillating motion mechanism and said lower motion mechanism are coupled to said upper connector and said lower connector respectively, said upper extension bar and said lower extension bar are adjustable in length supporting bars coupled to said upper connector and said lower connector respectively, wherein said upper extension bar includes in a center portion thereof said back cushion, said back cushion is adapted to receive a user's back, said upper extension bar includes in a proximal end thereof said head cushion, wherein said head cushion is adapted to receive a user's head, said proximal end further includes in a rear side and a front said thereof said upper handles, wherein said upper handles are ergonomic handles adapted to be grabbed by said user's hands, said vibration member generates vibrations to said housing, said lower connector and said upper connector, said pedals are coupled to a lateral edge of said lower extension bar, wherein said pedals are adapted to receive the user's feet, said upper oscillating motion mechanism and said lower oscillating motion mechanism transmit to said upper extension bar and said lower extension bar a vertical and a swing oscillating motion respectively, said housing cushion said back cushion and said head cushion are made of a padded material, wherein said vibration member is a device that generates vibrations which transmits said vibrations to said housing cushion said back cushion, said head cushion and said pedals, said upper connector and said upper extension bar are hingedly attached therebetween, allowing said upper extension bar that is configured to rotate according to the user's back when performing said workout routines.

18. A combined abdominal exerciser and treadmill, consisting of:

a console assembly including a console housing, a display screen, programable buttons, handles, a bar support, an adjustable bar support, a remote controller, and a speaker, wherein said console housing has a hollow body where inside therein includes a circuitry to operatively connect an actuate said display screen, said programmable buttons, and said speaker, said remoter controller is wirelessly connected, said console housing includes storage receptacles in a front side thereof, said display screen and said programmable buttons and said speaker are placed in a front side thereof, said handles are placed in a bottom side of said housing console, wherein said handles have and ergonomic shape that protrudes from said bottom said, wherein said handles are adapted to be grabbed by the user's hands, said bar support is attached to the rear side of the housing console, wherein said bar support provides a means of support for the housing console, said adjustable support is attached to a bottom edge of said bar support, wherein said adjustable bar support is adjustable in height, wherein said display screen is a touch screen with preconfigured and selectable workout routines, wherein said display screen allows an external device such as a mobile phone to be wirelessly connected, thereby a user may reproduce digital video and/or music through said display screen and said speakers, wherein said programmable buttons are configured to interact with said display as increase and decrease a time set up, a speed set up, an inclination set up of said workout routines, said adjustable bar support is an adjustable in height bar that allows to increase or decrease the height of the housing console, said remote controller includes configured buttons that allows the user to increase or decrease said time set up, said speed set up, said inclination set up of said workout routines and star/stop a workout routine wirelessly, wherein said handles includes a pulse heart rate sensor to measure a user's heart rate thereby said display screen is capable of calculate ad displayed user's health information levels such as body pressure, heart rate, calories, glucose, carbohydrates, fluids hydrates, after said workout routines, the console assembly further includes a circuitry, a processor and a memory that contains instructions that are readable by said processor, said programmable buttons, said remote controller, and said display screen are electrically connected to said processor, wherein said memory includes exercise routines that can be accessed and selected by means of said console assembly based on the user's input;

a treadmill assembly having a treadmill, a console support, and rotational bracket, wherein said treadmill is a device for walking, jogging, running and/or climbing, said console support is attached to a frame of the treadmill where said rotational bracket is attached on a top portion thereof, said rotational adjustable bar support is adapted to be coupled on said rotational bracket, wherein said rotational bracket is a rotating mechanism, wherein said console support is a structural support made of metal which is adapted to support said console assembly; and an oscillating motion assembly including a housing, an oscillating motion support, an upper oscillating motion mechanism, a lower oscillating motion mechanism, a housing cushion, an upper connector, a lower connector, an upper extension bar, a lower extension bar, back cushion, a head cushion, pedals, upper handles, housing handles, and a vibration member, wherein said housing is a hollow frame made of a metal material that includes on a top portion said housing cushion und further includes at the laterals thereof a portion of said upper connector and a portion of said lower connector, wherein the other portions of said upper connector and said lower connector extend past said lateral of said housing, said housing is attached to said oscillating motion support, wherein said oscillating motion support is a structural support to hold said housing, said oscillating motion support is removably attachable to said console support, said housing handles are attached to a read side and a front side of said housing, wherein said handles are adapted to be grabbed by said user's hands, said upper oscillating motion mechanism and said lower motion mechanism are oscillating mechanism driven by means of a motor of said treadmill, wherein said upper oscillating motion mechanism and said lower motion mechanism are coupled to said upper connector and said lower connector respectively, said upper extension bar and said lower extension bar are adjustable in length supporting bars coupled to said upper connector and said lower connector respectively, wherein said upper extension bar includes in a center portion thereof said back cushion, said back cushion is adapted to receive a user's back, said upper extension bar includes in a proximal end thereof said head cushion, wherein said head cushion is adapted to receive a user's head, said proximal end further includes in a rear side and a front said thereof said upper handles, wherein said upper handles are ergonomic handles adapted to be grabbed by said user's hands, said vibration member generates vibrations to said housing, said lower connector and said upper connector, said pedals are coupled to a lateral edge of said lower extension bar, wherein said pedals are adapted to receive the user's feet, said upper oscillating motion mechanism and said lower oscillating motion mechanism transmit to said upper extension bar and said lower extension bar a vertical and a swing oscillating motion respectively, said housing cushion said back cushion and said head cushion are made of a padded material, wherein said vibration member is a device that generates vibrations which transmits said vibrations to said housing cushion said back cushion, said head cushion and said pedals, said upper oscillating motion mechanism and said lower oscillation motion mechanism are driven by a pulley mechanism coupled to said motor of said treadmill, wherein said pulley mechanism is attached and detached from said motor by means of a coupling member according to said workout routines, said upper connector and said upper extension bar are hingedly attached therebetween, allowing said upper extension bar that is configured to rotate according to the user's back when performing said workout routines.

* * * * *